Patented June 17, 1941

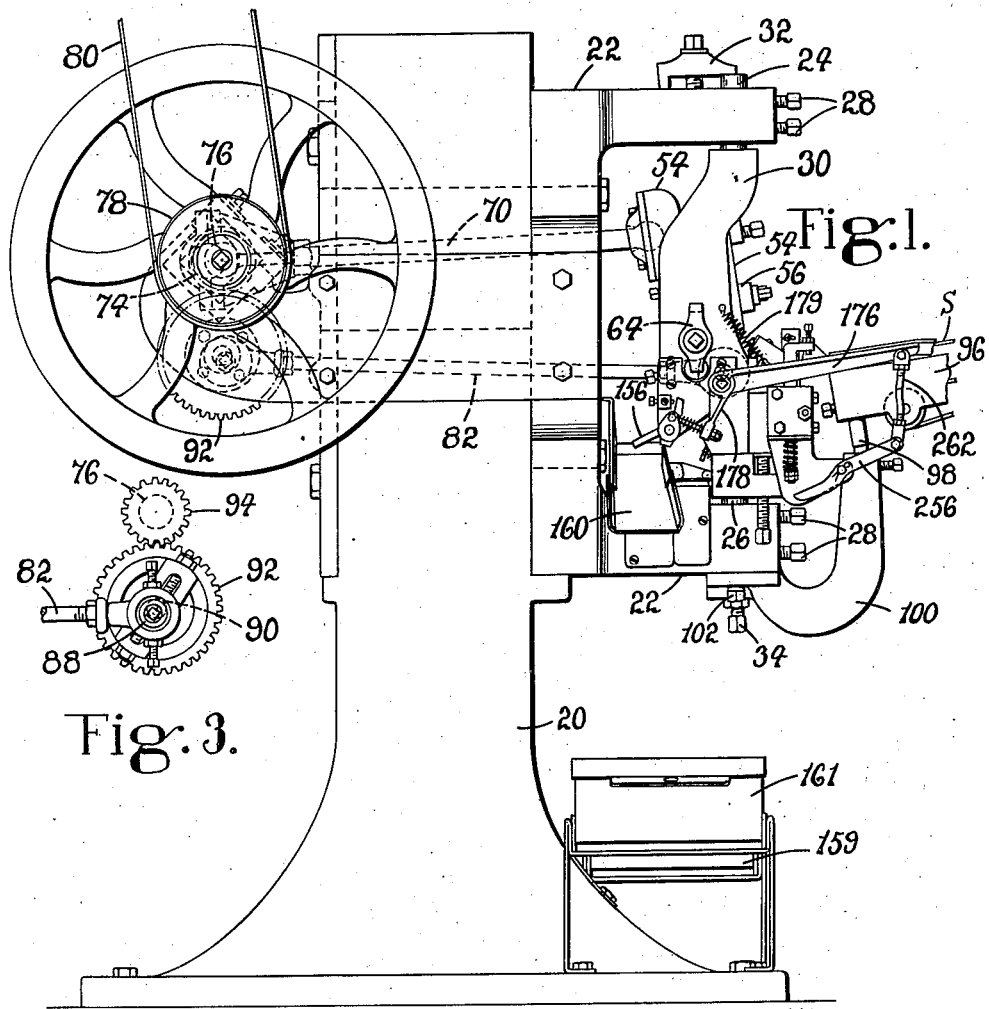
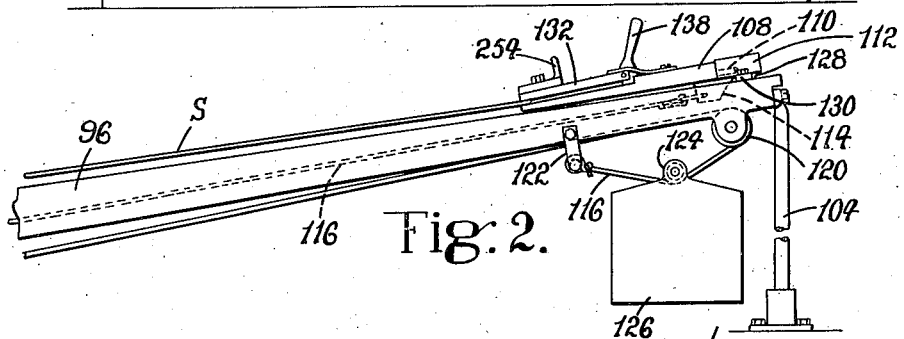

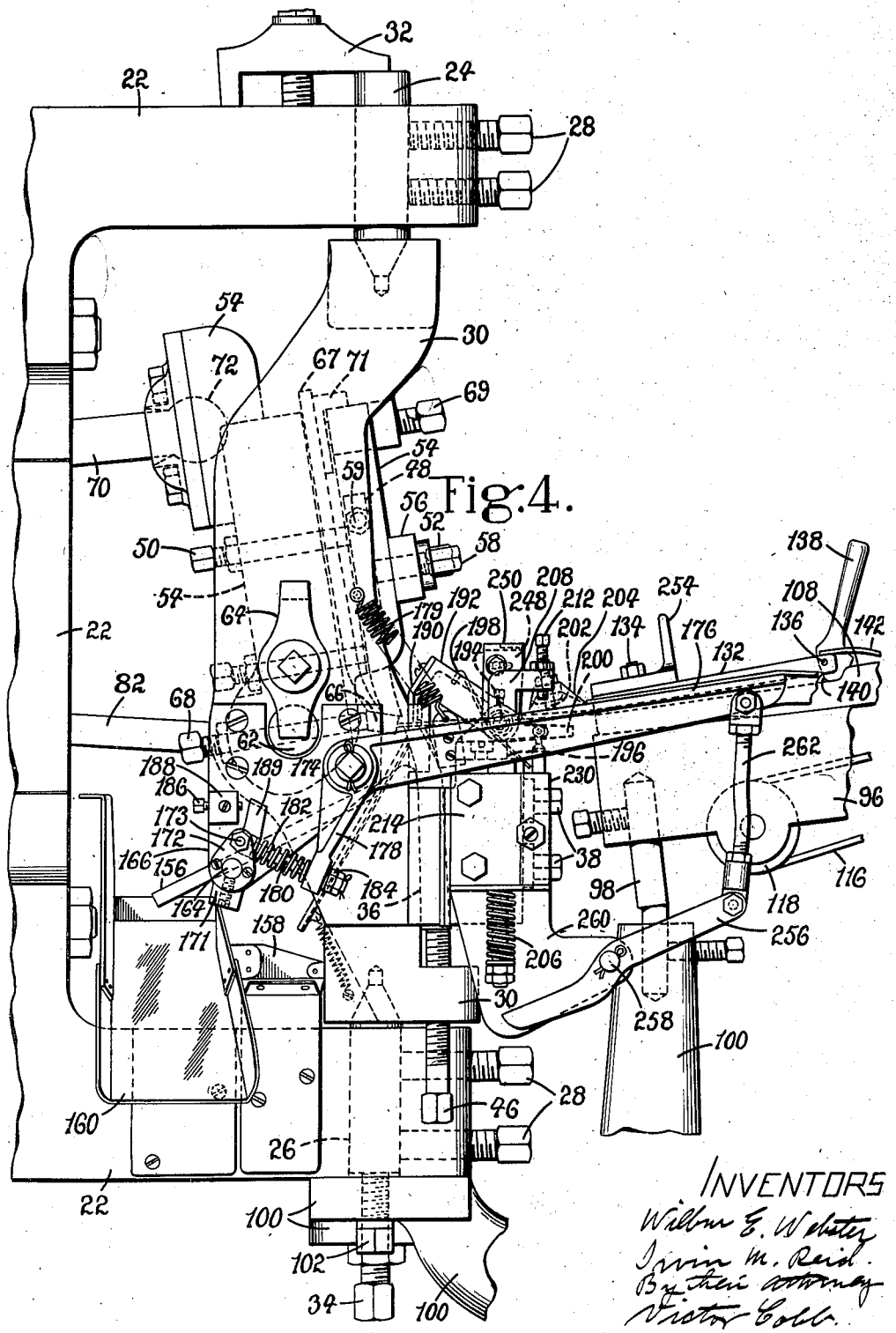

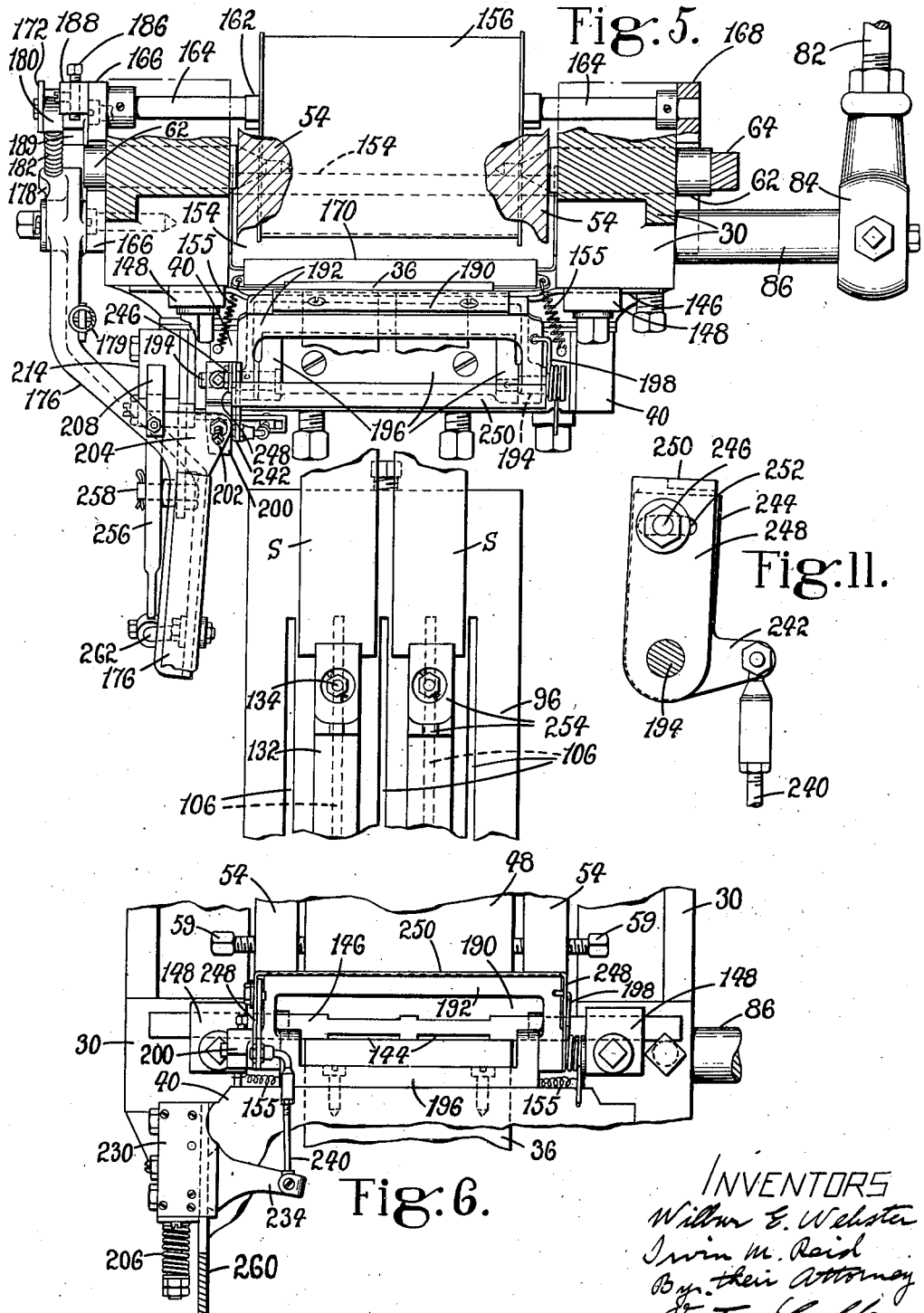

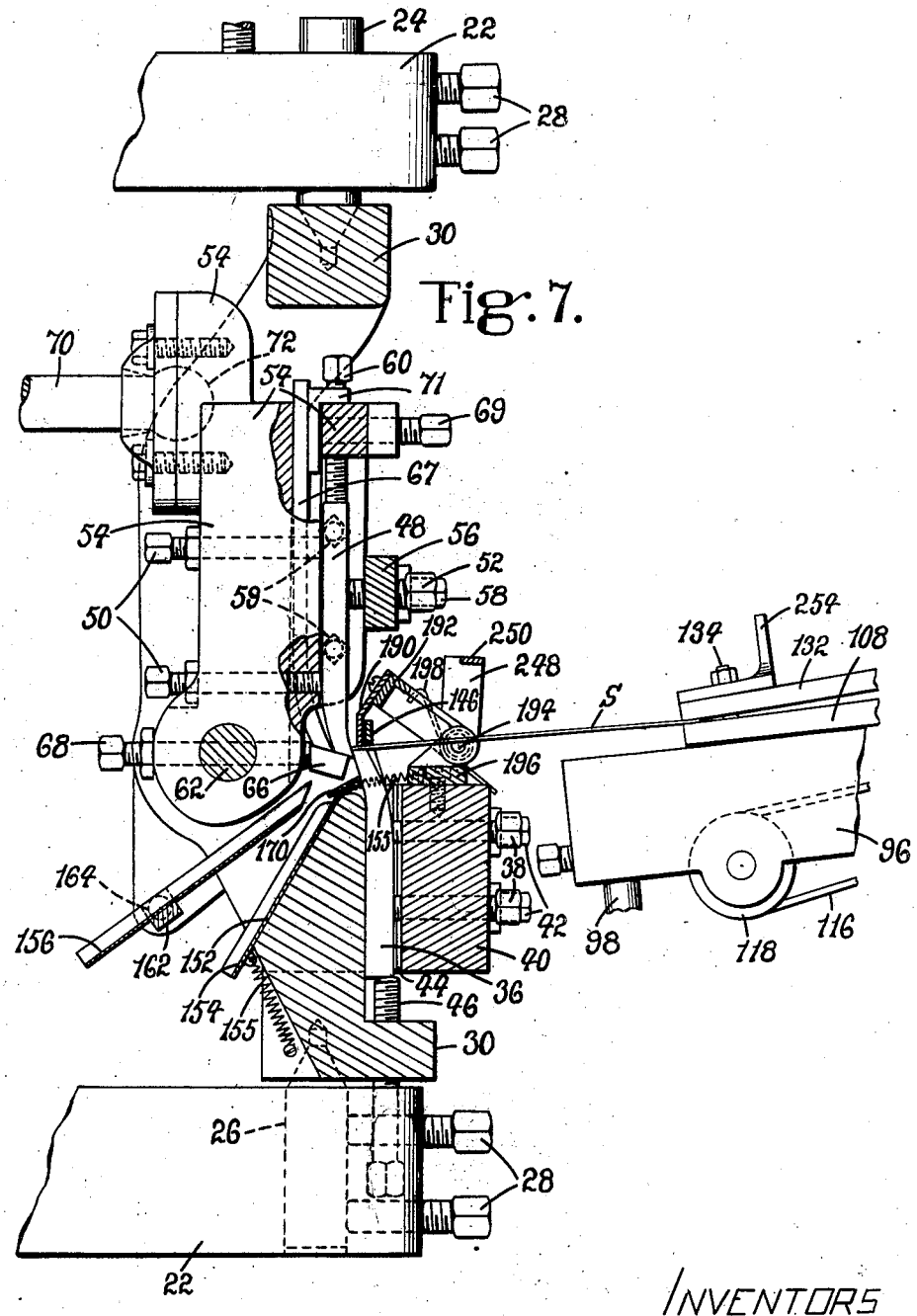

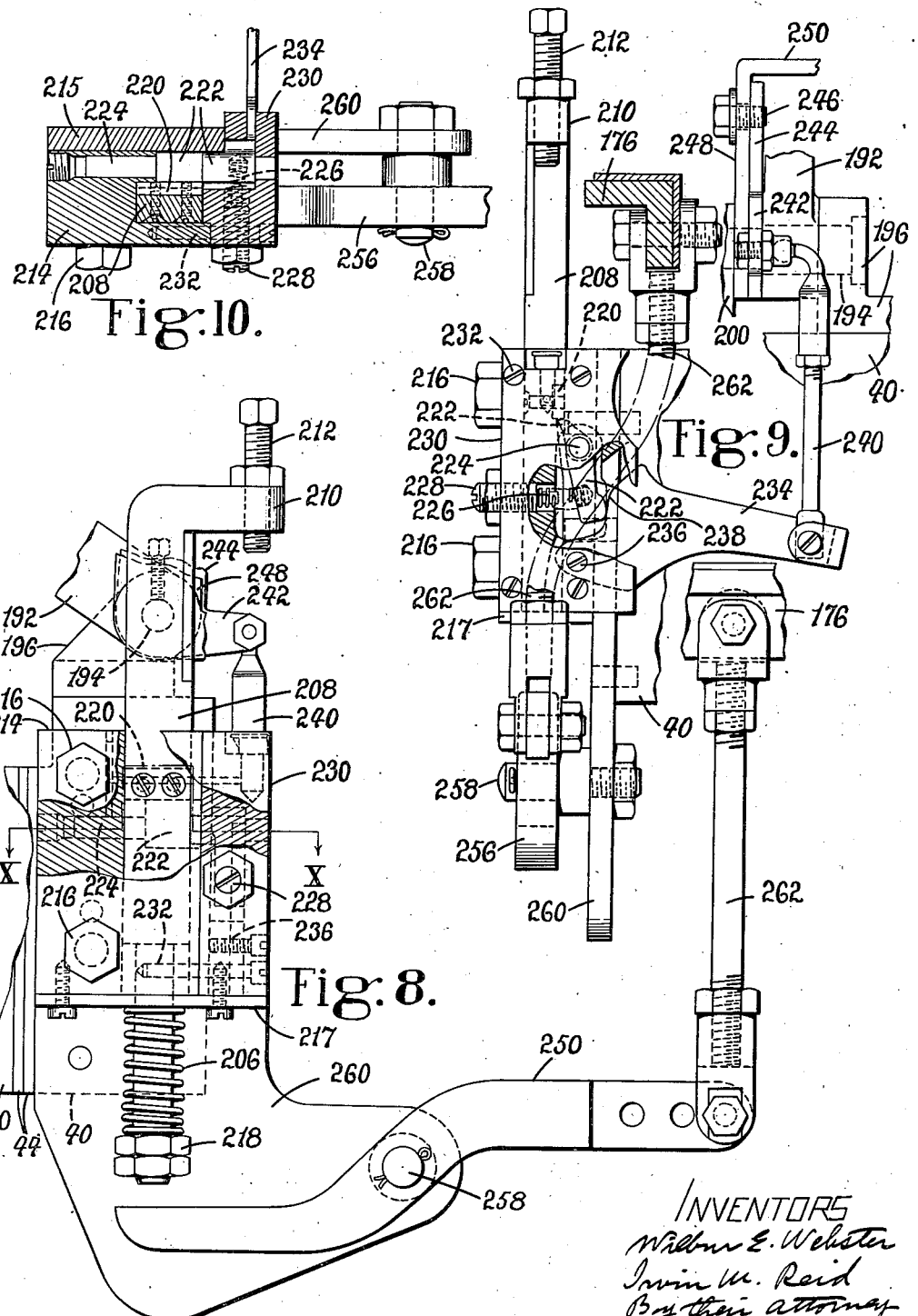

2,245,630

UNITED STATES PATENT OFFICE 2,245,630

MACHINE FOR CUTTING ARTICLES FROM STRIP MATERIAL

Wilbur E. Webster and Irvin M. Reid, Jaffrey, N. H., assignors to United Shoe Machinery Corporation, Borough of Flemington, N. J., a corporation of New Jersey Application July 26, 1938, Serial No. 221,372

22 Claims. (Cl. 10—32)

This invention relates to machines for cutting articles from strip material and is herein illustrated and described as embodied in a machine for making heel nails. It is often the case, for reasons which will later be explained, that articles cut from the end portions of a strip are imperfect and if allowed to mingle with the articles cut from the intermediate portion of the strip will give rise to trouble. For example, the imperfect pieces cut from the ends of a nail strip when allowed to mingle with the good nails frequently interfere with the operation of automatic heel nailing machines.

It is an object of the present invention to provide a machine organized to deliver pieces cut from the ends of a strip separately from the articles cut from the intermediate portion. In accordance with a feature of the invention, the illustrated nail-making machine is provided with operator-controlled means for starting the operation of a feeding mechanism and also with means under control of the starting means for effecting separate delivery of the first few pieces (which are likely to be imperfect) cut from one end of the strip and the good nails cut from the main portion of the strip. The illustrated machine is further provided with means for causing the guiding means to direct the last few pieces cut from a strip, which are likely also to be imperfect, to a point of delivery different from that of the good nails previously cut from the strip. The movement of a control member by which the operator starts the feed of a nail strip operates to load two springs one of which acts upon the guiding means to cause the good nails cut from the main portion of the strip to be delivered separately from the first few pieces, and the other of which operates to cause the guiding means to direct the last few pieces cut from the strip to a point of delivery different from that of the good nails. The first-mentioned spring is released as soon as the operator releases the control member. The second-mentioned spring, however, is latched against operative movement until released by the feeding mechanism as the nail strip approaches the end of its feeding movement.

The above and other features of the invention, including details of construction and combinations of parts, will now be more particularly described with reference to the accompanying drawings, in which Fig. 1 is a side elevation of the machine, omitting the greater portion of the feed table;

Fig. 2 is a side elevation of that portion of the feed table not shown in Fig. 1;

Fig. 3 is a view in elevation showing certain portions of the operating mechanism as seen from the side opposite to that shown in Fig. 1;

Fig. 4 is an enlarged side elevation of parts shown in Fig. 1;

Fig. 5 is a plan view, partly in section, of the mechanism shown in Fig. 4;

Fig. 6 is a front elevation of certain of the parts shown in Fig. 5;

Fig. 7 is a sectional view in side elevation of the parts shown in Fig. 4;

Fig. 8 is an enlarged side elevation, partly in section, of certain of the parts shown in Fig. 4;

Fig. 9 is a front elevation of the parts shown in Fig. 8;

Fig. 10 is a sectional view taken on the line X—X of Fig. 8; and

Fig. 11 is an enlarged view in side elevation of certain of the parts shown in Fig. 4.

The machine herein illustrated is organized to cut nails from a strip of sheet material or from several strips simultaneously. The length of the nails is equal to the width of the strips from which they are cut. The nails have no true heads and taper uniformly on two sides from a rectangular "head" to a rectangular "point." The other two sides of the nail are parallel, the distance between them being the thickness of the strip from which the nail is cut. The strip is fed lengthwise over a relatively stationary lower knife and the nails are cut by a movable upper knife. The width of the nail is determined by a back gage located rearwardly of the cutting edge of the upper knife. The taper is effected by inclining the cutting edges of the knives across the nail strip and by reversing this inclination for each cutting stroke, both knives being oscillated in unison and in synchronism with the cutting movements of the upper knife to accomplish this purpose.

The supporting structure of the machine comprises a frame 20 (Fig. 1) which may be bolted to the floor and which carries a bracket 22. Journaled upon trunnion pins 24 and 26 secured by set screws 28 in the bracket 22 is an oscillatory frame 30 in the form more or less generally of a hollow square. The upper pin 24 is held against end thrust by a clamp 32, while the lower pin 26 is in abutting relation to a screw 34 which may be tightened to take up end play.

A knife 36 (Fig. 7), which is the lower and relatively stationary knife, is clamped in the frame 30 by screws 38 threaded through a transverse bar 40 which, in turn, is clamped to the frame 30 by screws 42. The bar 40 is adjustably spaced from the frame 30 by shims 44 for a purpose which will later be explained. A plurality of screws 46 threaded through the frame 30 bear against the lower edge of the knife 36 for supporting the knife in a desired position of heightwise adjustment.

An upper, relatively movable knife 48 (Fig. 7) is rigidly secured, by clamping screws 50 bearing against its rearward face and by clamping screws 52 bearing against its forward face, to a frame 54 which is carried for heightwise cutting movement in the frame 30. The screws 52 are threaded through a transverse bar 56 which is clamped by screws 58 to the frame 54. The knife 48 is held against lateral movement by screws 59 threaded in the frame 54. Screws 60 in abutting relation with the upper surface of the knife 48 are provided for supporting the knife in a desired position of heightwise adjustment. The frame 54 is mounted upon trunnion pins 62 carried in the frame 30. Clamps 64, one of which is shown in Fig. 1 and the other of which is shown in Fig. 5, hold the pins 62 against end thrust.

Secured in the frame 54 in back of the knife 48 is a gage 66 in the form of a cross bar which may be adjusted forwardly or rearwardly by a pair of screws 68 threaded in the frame 54 to determine the width of a nail to be cut from a strip S. The gage 66 has an integral supporting stem 67 extending upwardly, the arrangement of the gage and its supporting stem being represented by the inverted letter T. The upper end of the stem 67 is clamped in a slot formed in the upper portion of the frame 54 by a screw 69 threaded in the frame 54 and secured by a lock nut, the screw 69 exerting clamping pressure against the stem 67 through a block 71. The spring of the stem 67 holds the gage 66 against the adjusting screws 68.

The knives 48 and 36 are so adjusted in relation to each other that the lower forward edge of the knife 48 cooperates with the upper rearward edge of the knife 36 to cut nails from the strip S. It is evident, referring to Fig. 4, that when the cutting edge of the knife 48 is raised above the cutting edge of the knife 36 the strip S may be advanced until it is stopped by the gage 66. The knife 48 upon descending to the position shown in Fig. 7 will then cut a nail, the width of which depends upon the adjustment of the gage 66. The knife 48 is thus reciprocated continuously, the cutting movements of the frame 54 in which the knife is carried being obtained from a rod 70 the forward end of which is connected to the frame 54 by a ball and socket joint 72 arranged for limited universal movement. The rear end of the rod 70 is operated by an eccentric 74 (Fig. 1) mounted upon a shaft 76 which, in turn, is supported in bearings carried by the frame 20 and is provided with a pulley 78 driven by a belt 80 from any suitable source of power.

As has previously been stated, the taper of the nails is a result of the inclination of the cutting edges of the knives relatively to the strip S, such inclination being reversed for each cutting stroke to provide an opposite taper upon opposite sides of the nail. This reversal of inclination is obtained by oscillating the frame 30 about the axis of the pins 24 and 26. To this end there is provided a rod 82 (Figs. 1 and 5), the forward end of which is connected by a universal joint 84 to an arm 86 extending laterally from the frame 30. The rearward end of the rod 82 is driven by an eccentric 88 (Fig. 3) mounted upon a shaft 90 driven through a pair of gears 92 and 94 from the shaft 76. The pitch diameters of the gears 94 and 92 are in relation of 1 to 2 to cause the eccentric 88 to be driven at half the speed of the eccentric 74, thus causing the upper knife 48 to perform two cutting movements for each complete oscillation of the frame 30 or one cutting movement for each half oscillation of the frame 30. This cutting movement takes place during the reversal of movement of the frame 30, at which time the frame is in its extreme position of inclination and is substantially stationary.

The nail strips S are fed along a stationary feed table 96 (Figs. 1, 2 and 4) the rear end of which is supported upon a rod 98 carried by a bracket 100 which in turn is clamped by screws 102 to the under surface of the bracket 22. The forward end of the feed table 96 is supported by a pair of standards 104, one of which is shown in Fig. 2. The feed table 96 has formed in it a plurality of longitudinal slots 106 (Fig. 5) each of which serves to guide a feed carriage 108 to which is clamped the forward or trailing end of one of the nail strips S. Each feed carriage 108 is detachably connected by a dowel pin 110 (Fig. 2) to a block 112 having a lug 114 which extends downwardly through one of the slots 106. Secured to the lug 114 is a cable 116 which is looped around a pulley 118 at the rearward end of the table 96 and is again looped around a pulley 120 at the forward end table 96, the opposite end of the cable being secured to a bracket 122 mounted on the forward portion of the table 96. Suspended by a pulley 124 on the cable 116 between the bracket 122 and the pulley 120 is a weight 126 which creates a tension in the cable 116 tending to pull the feed carriage 108 rearwardly. The block 112 may be held at the forward end of the table 96 by a latch lug 128 extending downwardly from the block 112 and engageable with a transverse bar 130 secured upon the upper surface of the table 96. The feed carriage 108 is provided with an upper nipper jaw 132 for enabling it to grip the trailing end of the strip S. The rearward portion of the jaw 132 is secured loosely by a bolt 134 to the carriage 108. Fulcrumed upon a pin 136 (Fig. 4) mounted in the forward portion of the jaw 132 is a handle 138 having a cam 140 engageable with the upper surface of the carriage 108 and having two relatively flat surfaces one of which maintains the forward end of the jack raised against the pressure of a spring 142 and the other of which enables the forward end of the jack to be lowered under the influence of the spring 142. In Fig. 4 the handle 138 is shown in position to maintain the forward end of the jack 132 raised, thereby causing the jack 132 to fulcrum upon the head of the bolt 134 to clamp the strip S against the upper surface of the carriage 108.

The leading end of each of the strips S passes loosely through a notch 144 (Fig. 6), formed in a guide member 146 secured by clamps 148 to the frame 30. Forward movement of the carriage 108 is limited by the lug 114 engaging the end of the slot 106. The lower cross member of the frame 30 has a beveled surface 152 (Fig. 7) along which the nails may slide in their passage to a suitable receptacle.

The operation of the machine as so far described will be obvious, it being evident that the weights 126 operate yieldingly to advance the strips S to bring the forward ends of the strips into abutting engagement with the gage 66 while the knife 48 is raised, whereupon the knife 48 in descending will cut nails which will fall down the inclined surface 152 into a receptacle.

It should be observed that when a new nail strip is introduced into the machine the square cut leading end of the strip will come into engagement at one corner only with the gage 66. The knife 48 in descending will make an inclined cut, and the narrow end of the piece severed from the strip will have a width equal to the distance between the gage 66 and the cutting edge of the knife 48, this width being the same as that of the "head" of an ordinary nail. The opposite end of the piece will be still wider because of the inclination of the knives. The first piece, therefore, cut from every nail strip is not a nail but a piece of waste material considerably larger than a nail. Furthermore, it usually happens that the end portions of a nail strip are of less than the normal thickness of the strip with the result that the first and the last few pieces cut from a strip will be thinner than normal nails and should therefore be discarded. A still further difficulty occurs at the end of the operation upon a nail strip. After the carriage 108 has been brought to a stop the oscillatory movement of the frame 30 will cause the knives to cut a few thin slivers from the nail strips, notwithstanding that their feeding movement has stopped. This effect is more pronounced in the case of the outermost strips when several strips are fed simultaneously. All of these waste pieces, if allowed to mingle with the normal nails, are a source of trouble, particularly if the nails are to be used in automatic nailing machines, such as machines for nailing shoe heels.

It is a purpose of the mechanism now about to be described to provide for the separate delivery of waste pieces cut from the end portions of a nail strip and the normal nails cut from the main portion of the strip. Such separate delivery is accomplished by providing a relatively stationary chute 154 (Figs. 5 and 7) secured by springs 155 (for convenient removal for the purpose of cleaning) upon the surface 152 of the frame 30, and a relatively movable chute 156 which may be moved from an inoperative position to an operative position wherein it intercepts nails falling down the chute 154. A chute 158 (the back of the upper portion of which appears in Fig. 4) secured upon the bracket 22 is positioned to receive nails and waste pieces coming down the chute 154 and to direct them into a receptacle 159 (Fig. 1) for waste pieces on the right-hand side of the machine. A chute 160 secured to the bracket 22 is positioned to receive nails sliding down the chute 156 and conduct them to a receptacle 161 for good nails on the left-hand side of the machine. The chute 156 is secured for tilting movement upon a crossbar 162 (Figs. 5 and 7) having cylindrical end portions 164 which are journaled in suitable bearings formed in brackets 166 (see also Fig. 4) and 168 mounted upon the left-hand and right-hand sides of the frame 30, respectively. The chute 156 is shown in Fig. 7 in its inoperative position, the forward end of the chute 156 being out of engagement with the chute 154. The chute 156 may be swung into operative position to bring its forward edge into engagement with the chute 154, thereby intercepting any nails or waste pieces sliding down the chute 154. In order to insure against the forward edge of the chute 156 engaging pieces which may be sliding down the chute 154 and clamping such pieces against the chute 154, a lip 170 is provided at the upper end of the chute 154. The lip 170 overhangs the upper portion of the chute 154 to enable the nails to fall freely and thereby minimize any possibility of their being lodged between the two chutes.

The chute 156 is tilted by a rocker arm extending upwardly from a block 171 (Fig. 4) secured by a set screw to one of the cylindrical end portions 164 of the crossbar 162. The main portion of this rocker arm is concealed in Fig. 4 by a plate 172 (Figs. 4 and 5) which is secured directly to the end face of the block 171. The rocker arm is spaced inwardly from the plate 172 and has an upwardly extending portion 189 which is engageable with a stop screw 186 threaded through a lug 188 on the bracket 166 to limit upward tilting of the chute 156. A pin 173 having its ends secured in the plate 172 and in the rocker arm bridges the space between the plate and the rocker arm.

A control lever 176 (Figs. 1, 4 and 5) fulcrumed upon a pin 174 mounted in the frame 30 has a handle formed on its forward end conveniently within reach of the operator, and it also has a downwardly and rearwardly extending arm 178. A spring 179 normally holds the lever 176 up. Pivotally mounted upon the pin 173 and loosely passing through the arm 178 is a pin 180. A coil compression spring 182 surrounding the pin 180 is interposed between the arm 178 and a shoulder on the pin 180. A nut 184 threaded upon the outer end of the pin 180 retains the pin 180 within its opening in the arm 178. Referring to Fig. 4, it is evident that depression of the lever 176 will yieldingly transmit the thrust through the spring 182 to rock the chute 156 from its operative position into the inoperative position shown in Fig. 7, with the extension 189 engaging the stop screw 186. The lever 176 may be further depressed without affecting the nail chute 156, such movement of the lever being accommodated by the compression of the spring 182.

In order to prevent the introduction of a nail strip to the knives before the chute 156 has been moved to its inoperative position there is provided a stop gate 190 (Figs. 4, 5, 6 and 7) in the form of a plate of sheet metal which initially rests upon the narrow upper surface of the lower knife 36. The stop gate 190 is mounted upon a yoke-shaped cross member 192 having depending arms which are pivotally mounted upon a pair of coaxial pins 194 secured in a transverse bracket 196 which, in turn, is secured to the upper surface of the transverse bar 40. The shims 44 provide for adjustment of the transverse bar to position the stop gate 190 accurately with reference to the knife 36. A torsion spring 198 urges the stop gate 190 downwardly into its initial or operative position wherein it rests upon the narrow upper surface of the knife 36 and engages the leading end of a nail strip to hold back the nail strip against the urge of the feeding mechanism previously described. Extending from the left-hand fulcrum pin 194 is an arm 200 (Figs. 4 and 5) which is engageable by a screw 202 adjustably threaded through an extension 204 of the lever 176. Depression of the lever 176 will cause the screw 202 to rock the arm 200 and the frame 192 in a clockwise direction, as viewed in Fig. 4, thereby raising the stop gate 190 and releasing the nail strip S to the action of the feeding mechanism. The screw 202, however, is so adjusted as to delay raising the stop gate until the nail chute 156 has been moved into its inoperative position. The operator, after depressing the lever 176, releases it immediately. As the lever moves upwardly to normal or operating position under the influence of the spring 179 the arm 178, acting through the pin 180, draws the nail chute 156 into its operative position. The engagement of the forward edge of the chute 156 with the chute 154 limits the upward movement of the lever 176, the normal position of this lever being adjustable up or down by turning the nut 184 on the pin 180. Before the upward movement of the lever 176 can be completed, however, the feeding mechanism will have caused several pieces to be cut from the leading end of the nail strip and these pieces will drop down the chute 154 from which they will pass to the chute 158 and thence into the receptacle 159 for waste pieces. As soon as the chute 156 has moved into its operative position it will intercept the nails passing over the lip 170 and the chute 154 and will transfer the nails to the chute 160 and thence into the receptacle 161 on the left-hand side of the machine for good nails. The return of the control lever 176 to normal position enables the stop gate 190 to descend under the influence of the spring 198 until it rides upon the upper surface of the nail strip S.

It is desirable, for reasons already pointed out, to insure that the last few pieces to be cut from the strip will be directed into the receptacle for waste pieces. To this end there is provided a mechanism for automatically swinging the chute 156 into its inoperative position as the nail strip approaches the end of its feeding movement. This mechanism is operated by a coil compression spring 206 (Figs. 4 and 8) acting through a slide 208 having an overhanging portion 210 through which is adjustably threaded a screw 212. The slide 208 is guided for heightwise movement in a guideway formed in a housing (Figs. 8, 9 and 10) comprising a block 214 and a plate 215, both of which are secured by screws 216 to an end of the transverse bar 48. The lower end portion of the slide is cylindrical and is surrounded by the spring 206 which is interposed between a plate 217 secured to the under surface of the housing member 214 and a nut 218 threaded on the lower end of the slide 208. Secured in a recess formed in one of the sides of the slide 208 is a hardened steel block 220 having an under surface which extends outwardly beyond the lateral surface of the slide. This under surface of the block 220 is engageable by a latch 222 to hold the slide 208 up against the force of the spring 206. The latch 222 is fulcrumed upon a pin 224 which is journaled in suitable bearings formed in the housing member 214. A compression spring 226 interposed between a depending tail of the latch 222 and the stationary portion of the housing 214 urges the latch toward latching position. One end of the spring 226 is received within a recess formed in the latch, while the other end bears against a block 228 which is threaded into an opening through the wall of a block 230 which constitutes a portion of the housing and is secured to the member 214 by screws 232. The block 230 is slotted to receive a cam 234 which is pivotally mounted upon a pin 236 secured in the block 230. The cam 234 has an operating surface 238 (Fig. 9) engageable with the depending tail of the latch 222 to move the latch into unlatching position when the cam 234 is raised about its pivot pin 236.

Pivotally connected to the cam 234 is the lower end of a rod 240 the upper end of which is pivotally connected to an arm 242 (Fig. 11) which constitutes a part of a bell crank fulcrumed upon the left-hand pin 194. The above-mentioned bell crank has an upwardly extending arm 244 which is connected by a screw 246 to one of a pair of downwardly extending arms 248 (Figs. 6, 7 and 11) which constitute a portion of a yoke-shaped member. The two arms 248 are connected at their upper ends by a transverse bar 250 (see also Fig. 7) and are fulcrumed at their lower ends upon the pins 194. In order to provide for relative adjustment between the bell crank 242, 244 and the yoke-shaped member 248, 250, the depending arm 248 is provided with an arcuate slot 252 concentric with the pin 194 to accommodate the screw 246. The relative angular positions of the yoke-shaped member and the bell crank may be adjusted by loosening the screw 246, and the two members may be disconnected from the bell crank to enable it to be moved to an out-of-the-way position when access to the machine is desired for purposes of cleaning, adjusting or repair.

Secured by means additional to the loose bolt 134 upon each of the nipper jaws 132 of the feed carriages is an upstanding lug 254 (Fig. 7). As the feed carriages advance, the lug 254 of the foremost feed carriage will engage the transverse yoke bar 250 and will rock the bell crank 242, 244 thereby raising the rod 240 and tripping the latch 222, and enabling the spring 206 to urge the slide 208 downwardly, whereupon the screw 212 will engage the upper surface of the control lever 176 and thereby swing the chute 156 into its inoperative position, whereupon the waste pieces cut from the end of the strips will be guided down the chute 154 to the chute 158 and thence into the receptacle for waste pieces. While this movement of the chute 156 is taking place the bell crank 242, 244 will continue to rock until prevented by the tail of the latch 222 coming into engagement with the inner wall of the block 230. The transverse bar 250 will thereupon stop further advance of the feed carriage, but not until the chute 156 has been moved into its inoperative position.

In order to insure that the spring 206 will be compressed and that the slide 208 will be latched in its upward position, there is provided a lever 256 (Figs. 4 and 8) fulcrumed upon a pin 258 secured in a downward extension 260 of the plate 254. One end of the lever 256 is pivotally connected to the lower end of a link 262, the upper end of which link is pivotally connected to the control lever 176. Depression of the control lever 176 will rock the lever 256, causing the free end of the latter to engage the lower end of the slide 208 to raise the slide into latching position against the force of the spring 206. The adjustment of the screw 202 should provide for sufficient downward movement of the control lever not only to rock the chute 156 into its inoperative position but also to bring the lever 256 into engagement with the slide 208 and to raise the slide 208 into latching position before the stop gate 190 is raised to release the nail strips to the action of the feeding mechanism.

In operating the machine the feed carriages 108 are retracted by the operator against the force of the weights 126 and the nail strips S are introduced one by one into the guide notches 144, the forward ends of the nail strips being clamped by the nipper jaws 132. In the ordinary course of operation it is unnecessary to retract the feed carriages to their positions of latching over the bar 130 inasmuch as the stop gate 190 will hold the strips against the action of the feeding mechanism. The operator now depresses the control lever 176, causing first the chute 156 to move into inoperative position, then raising the slide 208 into latched position and at the same time loading the spring 206, and finally raising the stop gate 190 to release all the nail strips to the action of the feeding mechanism. The operator releases the control lever as soon as the feed of the nail strips has begun, and the spring 179 which has been loaded by depression of the control lever returns the control lever to its normal or upper position. The action of the feeding mechanism, however, is so rapid that several waste pieces cut from the leading ends of the strips will be directed into the receptacle for waste pieces before the chute 156 returns to its operative position to direct good nails into the receptacle provided for them. As soon as the feeding movement nears completion the lug 254 of the foremost feed carriage will engage the transverse bar 250 and cause the slide 208 to be released, whereupon the spring 206 will urge the slide downwardly and cause the control lever to be depressed sufficiently again to move the chute 156 into inoperative position. The last few pieces cut from the strips will thereupon be directed into the receptacle for waste pieces. The operator then retracts the feed carriages 108 and as he does so withdraws the butt ends of the strips from between the stop gate 190 and the upper edge of the lower knife 36, enabling the spring 198 to move the stop gate into its operative position. It will be observed that while he is supplying a new set of nail strips to the machine the chute 156 will remain in its inoperative position. Upon depressing the control lever to release the new lot of nail strips, the first portion of the downward movement, that required to move the chute 156 to inoperative position, has already been accomplished by the spring 206 so that the operator will only have to move the lever far enough to compress the spring 206 to enable the slide 208 to be latched and then far enough to raise the stop gate 190. It is evident that in the operation of the machine the chute 156 can only occupy its inoperative position when the control lever is all the way up.

Having described our invention, what we claim as new and desire to secure by Letters Patent of the United States is:

1. In a nail-making machine, nail cutting instrumentalities, yieldable means for feeding a nail strip to said cutting instrumentalities, means for holding a nail strip against the operation of said feeding means, means operable upon said holding means to release the nail strip to the operation of said feeding means, and means operated by said releasing means for effecting the separate delivery of the first few pieces cut from the strip and the good nails thereafter cut from the strip.

2. In a nail-making machine, nail cutting instrumentalities, yieldable mechanism for feeding nail strips to said cutting instrumentalities, a stop engageable with the leading end of a nail strip to prevent the feeding of the strip, a control handle, a connection for moving said stop to an inoperative position to start the feed of the nail strip upon movement of said control handle, a guide for directing pieces cut from the nail strip to a point of delivery, a chute constructed and arranged for movement from an inoperative position to a position wherein it intercepts cut pieces in their passage toward said point of delivery and directs them to a different point of delivery, and a connection between said control handle and said chute for moving the chute between said positions upon return movement of said control handle.

3. In a nail-making machine, nail cutting instrumentalities, a feed carriage engageable with the trailing end of a nail strip, a weight, a connection between said weight and said feed carriage for advancing the carriage to feed the nail strip to said cutting instrumentalities as the weight descends, a guide for directing pieces cut from a nail strip to a point of delivery, a chute constructed and arranged for movement to an inoperative position from a position wherein it intercepts cut pieces in their passage toward said point of delivery and directs them to a different point of delivery, a member interposed in the path of said feed carriage, and a connection between said member and said chute for moving the chute between said positions when said member is engaged by the feed carriage.

4. In a nail-making machine, nail cutting instrumentalities, means for starting the feed of a nail strip to said cutting instrumentalities, a spring constructed and arranged to be loaded by the operation of said starting means, means for guiding the pieces cut from the strip to a point of delivery, and means operated by said spring for causing said guiding means to vary said point of delivery to insure separation of the waste pieces cut from an end of the strip from the good nails cut from an intermediate portion of the strip.

5. In a nail-making machine, nail cutting instrumentalities, means including a control member for starting the feed of a nail strip to said cutting instrumentalities, a spring for holding said control member in a normal position, means for guiding the pieces cut from the strip to a point of delivery, and means operated by said spring in returning said control member to normal position after the feed of the nail strip has been started, for causing said guiding means to vary said point of delivery after the first few pieces have been cut from the strip to insure separate delivery of the good nails thereafter cut from the strip.

6. In a nail-making machine, nail cutting instrumentalities, means for feeding a nail strip to said cutting instrumentalities, means for starting the operation of said feeding means, resilient means constructed and arranged to be loaded by the operation of said starting means, means for guiding the pieces cut from the strip to a point of delivery, and means operated by said resilient means for causing said guiding means to vary said point of delivery after the first few pieces have been cut from the strip and again before the last few pieces are cut from the strip to insure separation of the good nails cut from the intermediate portion of the strip from the waste pieces cut from the end portions.

7. In a nail-making machine, nail cutting instrumentalities, means for feeding a nail strip to said cutting instrumentalities, means for starting the operation of said feeding means, two springs constructed and arranged to be loaded by the operation of said starting means, means for guiding the pieces cut from the strip to a point of delivery, means operated by one of said springs for causing the guiding means, after the first few waste pieces have been cut from the strip, to direct the good nails cut from the intermediate portion of the strip to a different point of delivery, and means operated by the other of said springs and controlled by said feeding means for causing said guiding means to direct the last few pieces cut from the strip to the first-mentioned point of delivery.

8. In a nail making machine, nail cutting instrumentalities, means for feeding a nail strip to said cutting instrumentalities, means for starting the operation of said feeding means, a spring constructed and arranged to be loaded by the operation of said starting means, means for guiding the pieces cut from the strip to a point of delivery, and means operated by said spring under control of said feeding means for causing the guiding means to direct the last few pieces cut from the strip to a point of delivery different from that of the good nails cut from the intermediate portion of the strip.

9. In a nail making machine, nail cutting instrumentalities, means for feeding a nail strip to said cutting instrumentalities, means for starting the operation of said feeding means, a spring constructed and arranged to be loaded by the operation of said starting means, a latch for keeping said spring loaded, means for guiding the pieces cut from the strip to a point of delivery, means operated by said feeding means for tripping said latch as the nail strip approaches the end of its feeding movement, and means operated by said spring upon the tripping of said latch for causing said guiding means to direct the last few pieces cut from the strip to a point of delivery different from that of the good nails cut from the intermediate portion of the strip.

10. In a nail-making machine, nail cutting instrumentalities, means for feeding a nail strip to said cutting instrumentalities, means for guiding the pieces cut from the strip to a point of delivery, a spring, means for loading said spring, a latch for keeping said spring loaded, means operated by said feeding means for tripping said latch as the nail strip approaches the end of its feeding movement, and means operated by said spring upon the tripping of said latch for causing said guiding means to direct the last few pieces cut from the strip to a point of delivery different from that of the good nails cut from the intermediate portion of the strip.

11. In a nail-making machine, nail cutting instrumentalities, means for feeding nail strips to said cutting instrumentalities, means for stopping the operation of said feeding means as a nail strip approaches the end of its feeding movement, means for guiding the cut pieces, including good nails and waste pieces, to a point of delivery, and means operated by said feeding means for causing said guiding means to direct the last few pieces cut from a nail strip, which are likely to be imperfect, to a different point of delivery to insure their separation from pieces previously cut from the nail strip.

12. In a nail-making machine, nail cutting instrumentalities, means for feeding a nail strip to said nail cutting instrumentalities, means for controlling the operation of said feeding means, means for guiding the cut pieces including good nails and waste pieces, to a point of delivery, and means operated by said control means for causing said guide means to vary the point of delivery to cause the first and the last few pieces cut from a nail strip, which are likely to be imperfect, to be delivered separately from the good nails cut from the intermediate portion of the strip.

13. In a nail-making machine, nail cutting instrumentalities, gravity operated mechanism for feeding nail strips to said cutting instrumentalities, a stop engageable with the leading end of a nail strip to prevent the feeding of the strip, a control handle, a connection for moving said stop to an inoperative position to start the feed of the nail strip upon movement of said control handle, a receptacle for the cut pieces, a guide for directing the cut pieces to said receptacle, a second receptacle, a chute constructed and arranged for movement from an inoperative position to a position wherein it intercepts cut pieces in their passage toward the first-mentioned receptacle and directs them to the second-mentioned receptacle, and a connection between said control handle and said chute for moving the chute between said positions upon return movement of said control handle.

14. In a nail-making machine, nail-making instrumentalities, a chute by which pieces made by said nail-making instrumentalities are guided to a point of delivery, and a second chute for guiding such pieces to a different point of delivery, the second mentioned chute being constructed and arranged for movement from an inoperative position to a position of continuity with the first-mentioned chute, whereby different classes of pieces such as good nails and waste pieces may be guided to different points of delivery.

15. In a nail-making machine, nail cutting instrumentalities, means for feeding a nail strip to said cutting instrumentalities, means for starting the operation of said feeding means, a chute by which pieces cut by said nail-making instrumentalities are guided to a point of delivery, a second chute for guilding such cut pieces to a different point of delivery, the second-mentioned chute being constructed and arranged for movement between an inoperative position and a position of continuity with the first-mentioned chute, and means operated by said starting means for moving the second-mentioned chute from one to the other of said positions to cause some of the cut pieces such as good nails to be delivered separately from other cut pieces such as waste pieces.

16. In a nail-making machine, nail cutting instrumentalities, means for feeding a nail strip to said cutting instrumentalities, means for guiding pieces cut from the nail strip to a point of delivery, a control member, means operated by an initial movement of said control member for causing said guiding means to direct the cut pieces to a different point of delivery, means controlled by said feeding means for causing said control member to perform said initial movement as the feed of a nail strip nears completion, whereupon the last few pieces cut from that strip and the first few pieces to be cut from the next strip will be directed to the second-mentioned point of delivery, said control member being further movable by the operator, means operable upon such further movement of the control member for starting the feed of said next strip, and means for causing said guiding means again to direct the cut pieces to the first-mentioned point of delivery after the first few pieces have been cut from said next strip.

17. In a nail making machine, nail cutting instrumentalities, means for feeding a nail strip to said cutting instrumentalities, means for guiding pieces cut from the nail strip to a point of delivery, a control member, means operated by an initial movement of said control member for causing said guiding means to direct the cut pieces to a different point of delivery, a loadable mechanism releasable by said feeding means for causing said control member to perform said initial movement as the feed of a nail strip nears completion, whereupon the last few pieces cut from that strip and the first few pieces to be cut from the next strip will be directed to the second-mentioned point of delivery, said control member being further movable by the operator, means operable upon further movement of the control member to load said loadable mechanism in readiness later to be released by said feeding means, means operable upon still further movement of said control member by the operator to start the operation of said feeding means, and means for causing said guiding means again to direct the cut pieces to the first-mentioned point of delivery after the first few pieces have been cut from said next strip.

18. In a nail making machine, nail cutting instrumentalities, yieldable mechanism for feeding a nail strip to said cutting instrumentalities, a stop engageable with the leading end of a nail strip in advance of the locality at which said cutting instrumentalities operate upon the strip, said stop serving to hold the strip away from said locality of operation in opposition to said feeding mechanism, and operator-controlled means for moving said stop out of engagement with the nail strip to release the nail strip to the operation of the feeding mechanism.

19. In a nail making machine, a lower stationary knife having an upper surface which supports the leading end of a nail strip, an upper movable knife co-operating with said lower knife to cut nails from the leading end portion of the strip extending beyond said upper surface, yieldable mechanism for feeding a nail strip to said knives, a stop adapted to rest on said upper surface of said lower knife and engageable with the leading end of the nail strip to prevent the feeding of the strip, and means for raising said stop out of the path of the nail strip to enable the feeding mechanism to feed the nail strip beyond the upper surface of the lower knife and into the path of the upper knife.

20. In a nail-making machine, a pair of knives, means for continuously reciprocating one of said knives relatively to the other to cut pieces from a nail strip, means for feeding a nail strip to said knives, means for guiding the pieces cut from the nail strip, and means for causing said guiding means to direct the pieces cut from different portions of a strip to different points of delivery to insure the separation of normal nails cut from one portion of the strip from waste pieces cut from another portion.

21. In a nail-making machine, a pair of knives, means for continuously reciprocating one of said knives relatively to the other to cut pieces from a nail strip, normally inoperative means for feeding a nail strip to said knives, means for guiding to a point of delivery the pieces cut from a nail strip, operator-controlled means for starting said feeding means, and means operable in timed relation to the starting of the feed for causing said guiding means to divert the delivery of the cut pieces to a different point, thereby insuring separation of the pieces cut from different portions of the same strip, which pieces from one portion may constitute waste material and from another portion may consist of good nails.

22. In a nail-making machine, nail cutting instrumentalities adapted to be continuously operated, means for feeding a nail strip to said cutting instrumentalities, a manually operable control member for said means, means operated by said control member upon movement from a normal position to start the operation of said feeding means, means for returning said control member to normal position, said feeding means being constructed and arranged to continue the feed of the strip after the return of the control member to normal position, means for normally delivering to a particular locality the pieces cut from the strip, and means operated by said control member for causing the cut pieces to be delivered to a different locality during the period while the control member is away from normal position, thereby insuring separate delivery of the pieces cut during said period, which are likely to be imperfect.

WILBUR E. WEBSTER.
IRVIN M. REID.